United States Patent [19]

Diehl

[11] 4,176,682
[45] Dec. 4, 1979

[54] CHECK VALVE BALL STOP CLIP

[75] Inventor: William K. Diehl, Waterloo, Iowa

[73] Assignee: Deere & Company, Moline, Ill.

[21] Appl. No.: 887,959

[22] Filed: Mar. 20, 1978

Related U.S. Application Data

[63] Continuation of Ser. No. 675,614, Apr. 9, 1976, abandoned.

[51] Int. Cl.² ............................................. F16K 15/04
[52] U.S. Cl. .................................. 137/533.11; 137/539
[58] Field of Search .................... 137/512, 539, 533.11, 137/533.13, 533.15, 519.5; 85/8.1, 8.3

[56] References Cited

U.S. PATENT DOCUMENTS

| | | | |
|---|---|---|---|
| 1,700,603 | 1/1929 | Vreeland et al. | 137/533.13 X |
| 2,147,163 | 2/1939 | Jimerson | 85/8.3 X |
| 2,291,478 | 8/1942 | Taylor | 85/8.3 |
| 2,397,325 | 3/1946 | Newcomb | 85/8.3 X |

FOREIGN PATENT DOCUMENTS

| | | | |
|---|---|---|---|
| 2711135 | 10/1977 | Fed. Rep. of Germany | 137/533.11 |
| 780196 | 7/1957 | United Kingdom | 137/533.11 |

Primary Examiner—William R. Cline

[57] ABSTRACT

A check valve ball stop clip for use in Tee check valves has a U-shaped configuration with an outwardly projecting extension at the top of one of the arms. The Tee valve has a valve seat and a ball in the crossbar at one side of the upright. The stop clip is insertable and removable in a compressed condition through the upright of the Tee valve and is expandable to lock in the inner section of the upright and the crossbar such that one arm of the U holds the ball at the one side while the other arm with the extension holds the stop clip in place.

14 Claims, 2 Drawing Figures

CHECK VALVE BALL STOP CLIP

This is a continuation of application Ser. No. 675,614, filed Apr. 9, 1976, now abandoned.

BACKGROUND OF THE INVENTION

The present invention relates generally to Tee configuration check valves and more particularly to ball-retaining stops in these check valves.

In the past, a Tee check valve would be provided with a boss on the crossbar into which a hole would be drilled and reamed so as to allow the press fitting of a dowel pin therein for projection into the crossbar of the Tee to hold the ball in the side of the crossbar which had the ball valve seat. The disadvantages of this method include: the cost of drilling and reaming the hole in the Tee; the cost of the pin; the external leakage around the pin with high system pressures; the difficulty of removing the pin for maintenance; and the excessive material required in the Tee in order to be able to support the pin.

SUMMARY OF THE INVENTION

The present invention provides a stop clip which may be inserted into the Tee to snap in place and provide a positive stop for the ball while maintaining proper orientation with the ball. The stop clip has a U-shaped configuration with an outwardly projecting extension at the top of one arm. The stop clip cannot work loose but may be easily removed for maintenance.

The above and additional advantages of the present invention will become apparent to those skilled in the art from a consideration of the following detailed description of the preferred embodiments when taken in conjunction with the accompanying drawing.

DESCRIPTION OF THE PREFERRED EMBODIMENTS

Figure 1:
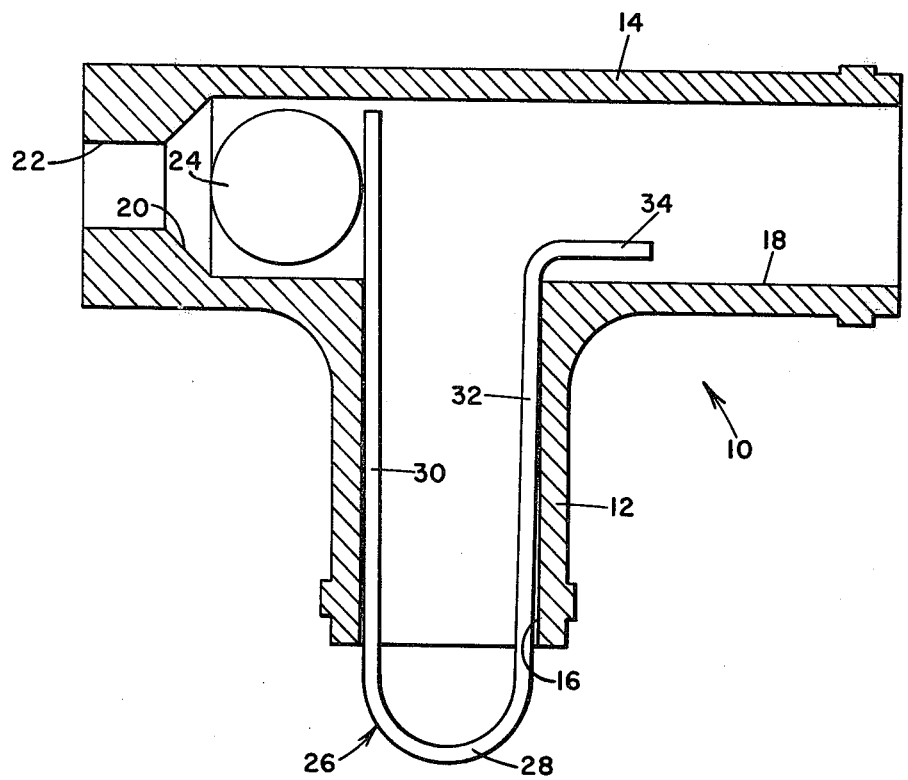
FIG. 1 is a cross-sectional view of a Tee configuration check valve including the present invention.

Referring now to FIG. 1, therein is shown a Tee check valve 10 having a Tee upright portion 12 and a Tee crossbar portion 14. The Tee upright portion 12 has provided therein a hole 16 which intersects a hole 18 in the Tee crossbar portion 14. The hole 18 terminates at one side of the Tee crossbar portion 14 in a ball valve seat 20 and an opening 22. A ball 24 is positioned in the hole 18 proximate the ball valve seat 20.

A check valve ball stop clip 26 is positioned in the hole 16 of the Tee upright portion 12. The stop clip 26 is of circular cross-section and has a U-base portion 28 and a first and second arms 30 and 32. The second arm 32 has an extension 34 which projects away from the U-shaped configuration of the stop clip 26 and projects into the hole 18. The first arm portion 30 also projects into and across the diameter of the hole 18 to prevent migration of the ball 24 along the hole 18 past the hole 16.

The stop clip 26 is made of a flexible material so that the first and second arms 30 and 32 may be compressed together for removal of the stop clip 26 from the Tee upright portion 12. Normal expansion of the stop clip 26 will hold the stop clip 26 in the Tee upright portion 12. The extension 34 acts both to retain the stop clip 26 in the hole 18 and to keep the first arm 30 centered across the diameter of hole 18.

Figure 2:
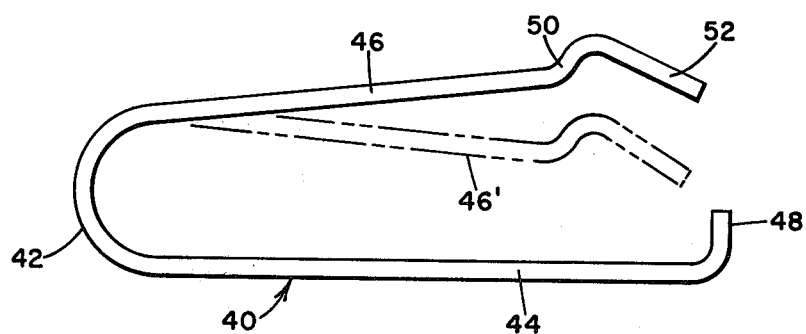
FIG. 2 is an alternate embodiment of the present invention.

Referring now to FIG. 2, therein is shown an alternate embodiment of the stop clip generally designated by the numeral 40. The stop clip 40 has a U-based portion 42 and a first and second arms 44 and 46. The first arm 44 includes a short radius bend 48 and the second arm includes a first extension 50 extending away from the U-configuration and a second extension 52 extending towards the U-configuration. The compressed position of the second arm 46 is shown by the phantom lines 46'. The second extention 52 and the bend 48 provide guidance for easy insertion of the stop clip 40 into the hole 16. The first extension 50 acts to hold the stop clip 40 in position on the hole 18 while permitting easy removal by pulling on the U-based portion 42. Again, the first arm portion 44 of the stop clip 40 acts to prevent migration of the ball 24.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. In a Tee check valve having a first fluid passage, a second fluid passage intersecting the first fluid passage, a ball valve seat provided in the second fluid passage to one side of the first fluid passage, and a movable ball positioned in the second fluid passage between the seat and first fluid passage, the improvement comprising: an internal stop clip having a generally U-shaped configuration flexible at the base of the U and having an extension at the top of one of the arms of the U extending outwardly from the U in the plane of the U, said stop clip insertable through the first fluid passage of the Tee valve in a compressed condition and expandable to be self-retaining at the intersection of the first and second fluid passages of the Tee check valve with the other one of the arms extending into the second fluid passage so as to retain the ball in the second fluid passage between the seat and first fluid passage.

2. The improvement as claimed in claim 1 including a further extension at the end of the extension at said top of one arm of the U extending inwardly in the plane of the U to facilitate installation of the stop clip in the Tee check valve.

3. The improvement as claimed in claim 1 wherein the stop clip is of circular cross-section.

4. In a check valve, the combination of a check valve body having an upright hole providing a portion of a fluid passage through the valve body and a crossbar hole perpendicularly intersecting the upright hole and providing the remaining portion of the fluid passage through the valve body, a ball valve seat provided in the crossbar hole to one side of the upright hole; a movable ball positioned in the crossbar hole between the seat and upright hole; and an internal stop clip having a U-shaped configuration flexible at the base of the U and having an extension at the top of one of the arms of the U extending outwardly from the U in the plane of the U, said stop clip insertable through the upright hole of the check valve body in a compressed condition and expandable to be self-retaining and self-centering at the intersection of the upright hole with the crossbar hole with the other one of the arms extending into the crossbar hole so as to retain the ball in the crossbar hole between the seat and upright hole.

5. The combination as claimed in claim 4 wherein the stop clip includes a further extension at the end of the extension at the top of the said arm of the U extending inwardly in the plane of the U to facilitate installation of the stop clip in the valve body.

6. The combination as claimed in claim 4 wherein the stop clip is of circular cross-section.

7. In a check valve having a valve body with a first circular cross-section fluid passage provided therein terminating in orifice means at one end thereof and a second circular cross-section fluid passage provided therein intersecting said first fluid passage and having a movable ball disposed in the first fluid passage between the orifice means and the intersection of the second fluid passage, the improvement comprising: an internal ball stop clip having a generally U-shaped configuration flexible at the base of the U and having first and second portions of the upright arms of the U substantially equal in length to the diameter of the first fluid passage with said first portion of the U extending outwardly from the U in the plane of the U, said stop clip insertable through the second fluid passage in a compressed condition and expandable with the first portion of the U positioned in the first fluid passage holding and preventing rotation of the stop clip in the second fluid passage and the second portion of the U extending into the first fluid passage blocking movement of the ball past the second fluid passage.

8. The improvement as claimed in claim 7 wherein the first portion of the U includes a third portion extending inwardly to the U in the plane of the U to facilitate installation of the stop clip in the valve body.

9. The improvement as claimed in claim 8 wherein the second portion of the U includes a fourth portion extending inwardly to the U in the plane of the U to facilitate installation of the stop clip in the valve body.

10. The improvement as claimed in claim 7 wherein the stop clip has a cross-sectional area substantially less than the cross-sectional area of the first or second fluid passage to provide minimum resistance to the flow of fluid through the first and second fluid passages.

11. In a check valve having a valve body with a first circular cross-section fluid passage provided therein having a reduced cross-section at one end thereof and a second circular cross-section fluid passage provided therein intersecting said first fluid passage and having a movable ball disposed in the first fluid passage between the reduced cross-section thereof and the intersection of the second fluid passage, the improvement comprising: an internal ball stop clip having a generally U-shaped configuration flexible at the base of the U and having a U with first and second upright arms spaced apart to pass through the second fluid passage, said stop clip having first and second portions respectively of the first and second upright arms of the U substantially equal in length to the diameter of the first fluid passage with said first portion of the U extending outward from the upright arm in the plane of the U, said stop clip insertable through the second fluid passage in a fully flexed condition and expandable to a partially unflexed condition with the first portion of the U positioned in the first fluid passage holding and preventing rotation of the stop clip in the second fluid passage and the second portion of the U extending across a diameter of the first fluid passage blocking movement of the ball past the second fluid passage.

12. The improvement as claimed in claim 11 wherein the first portion of the U extends perpendicularly outward from the first upright arm.

13. The improvement as claimed in claim 11 wherein the first and second portions of the upright arms include portions proximate the tops thereof extending inwardly towards each other to facilitate installation of the stop clip in the valve body.

14. The improvement as claimed in claim 11 wherein the stop clip has a circular cross-sectional area substantially less than the circular cross-sectional area of the first or second fluid passage to provide minimum resistance to the flow of fluid through the first and second fluid passages.

* * * * *